(12) United States Patent
Choate

(10) Patent No.: US 6,588,076 B1
(45) Date of Patent: Jul. 8, 2003

(54) CARABINER WITH LOCKING GATE

(76) Inventor: Gary E. Choate, 1675 Carr St., #101N, Lakewood, CO (US) 80215

( * ) Notice: Subject to any disclaimer, the term of this patent is extended or adjusted under 35 U.S.C. 154(b) by 0 days.

(21) Appl. No.: 10/119,376

(22) Filed: Apr. 8, 2002

(51) Int. Cl.[7] ................................................ F16B 45/02
(52) U.S. Cl. ...................... 24/600.2; 24/599.9; 24/599.1
(58) Field of Search ............................. 24/598.1–598.3, 24/598.7, 599.1, 599.3–600.2; 63/12, 13; 59/84–86, 89; 294/82.17–82.23

(56) References Cited

U.S. PATENT DOCUMENTS

| | | | |
|---|---|---|---|
| 358,813 A | | 3/1887 | Jones |
| 558,056 A | * | 4/1896 | Fechner ........................ 24/599.5 |
| 684,419 A | * | 10/1901 | Farmer ........................ 24/599.2 |
| 1,283,972 A | * | 11/1918 | Thomson ........................ 59/85 |
| 1,415,692 A | * | 5/1922 | Pavoni ........................ 24/600.2 |
| 1,473,983 A | * | 11/1923 | White ........................ 294/82.21 |
| 1,886,726 A | * | 11/1932 | Pennefather ............... 24/600.4 |
| 5,791,025 A | | 8/1998 | Maurice et al. |
| 5,608,953 A | | 3/1997 | Petzl et al. |

FOREIGN PATENT DOCUMENTS

| | | | |
|---|---|---|---|
| DE | 25 36 204 A1 | * | 2/1977 |
| DE | 296 10 293 U1 | * | 10/1996 |
| EP | 0 318 742 | * | 7/1989 |
| GB | 2 077 838 A | * | 12/1981 |
| GB | 2 340 173 A | * | 2/2000 |

OTHER PUBLICATIONS

Eight Pictures of Carabiner Manufactured by HB Climbing Equipment of Bangor, Gwynedd LL 57 4YH, Wales UK (Purchased Over a Year from Filing of This Application.).

* cited by examiner

Primary Examiner—James R. Brittain
Assistant Examiner—Ruth C. Rodriguez
(74) Attorney, Agent, or Firm—Ramon L. Pizarro; Edwin H. Crabtree

(57) ABSTRACT

A carabiner having a gate with a locking mechanism. The locking mechanism includes a cylindrical locking element that must be rotated in order to release the gate, a guide pin that extends from the gate, and a guide that cooperates with the guide pin. The guide includes a jogged portion that prevents free rotation of the cylindrical locking element.

13 Claims, 3 Drawing Sheets

LOCKED

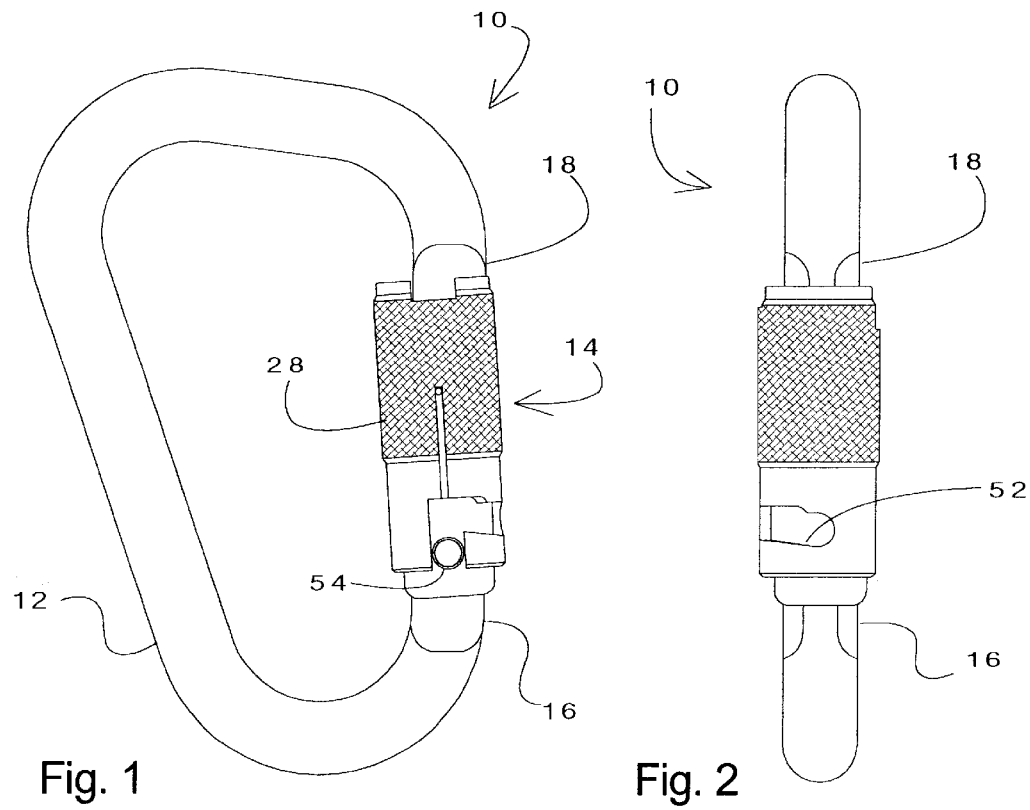
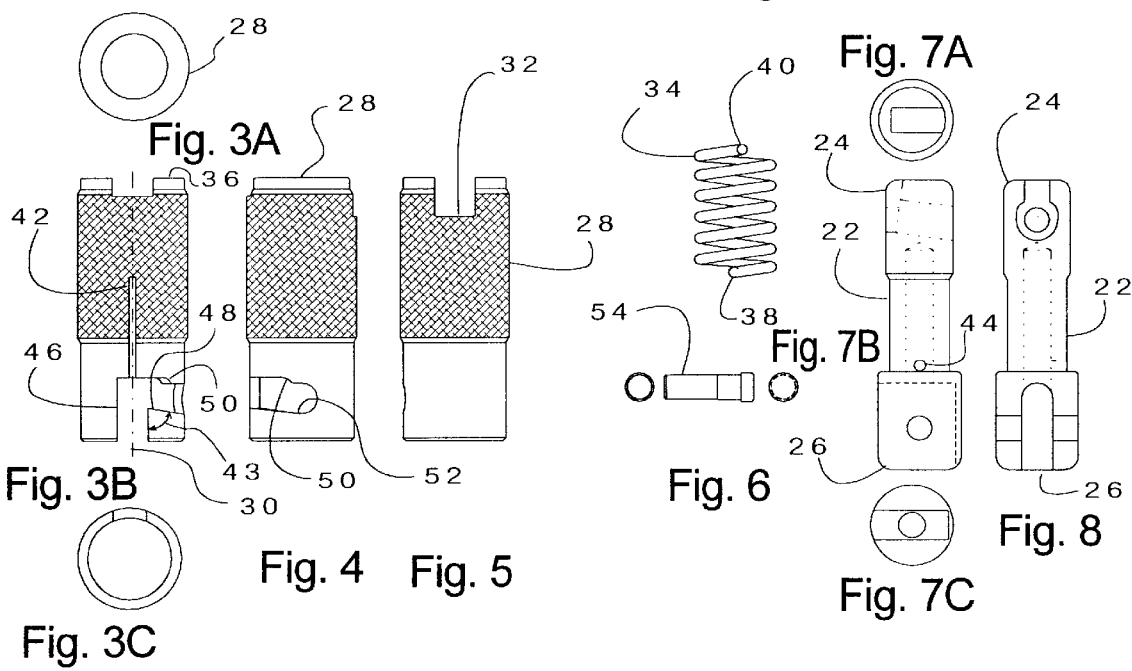

LOCKED

TURN

TURN PAST JOG TO UNLOCK

UNLOCKED

OPEN

CARABINER WITH LOCKING GATE

BACKGROUND OF THE INVENTION

1. Field of the Invention

The present invention relates to a snap-hook or a link with a generally C-shaped body and a gate that is used to prevent the hook or link from accidentally releasing ropes or other items held within the C-shaped body. More particularly, but not by way of limitation, to a carabiner having a locking mechanism that resists unwanted opening of the gate.

2. Known Art

There are many uses for snap hooks and carabiners, which are simply snap-hooks with a generally C-shaped body. One common use for these devices includes the retention of ropes or support rings within the mouth or C-shaped body of the hook in order to support a person in the event of a fall. A significant problem associated with carabiners has been the prevention of the inadvertent opening of the carabiner's gate. The opening of the gate, which can result in the accidental release of the ropes or support rings, is often caused by the accidental wrapping or twisting of the ropes or rings around the outside of the gate and C-shaped body, causing the gate to open if the rope or rings press against the outside of the gate.

Examples of attempts at resolving the problem associated with the undesired opening of a carabiner gate can be found in U.S. Pat. No. 5,608,953 to Petzl et al. and U.S. Pat. No. 5,791,025 to Maurice et al. These devices include a spring-loaded sliding, rotating lock mechanism that covers the connection between the gate and the nose of the C-shaped body of the carabiner, so as to prevent the inadvertent release of the gate from the nose of the C-shaped body. In order to prevent unwanted opening of the gate, these devices include a pushbutton that must be pressed in order to allow the lock mechanism to rotate. A significant problem associated with this type of mechanism is that the pushbutton needs to be concealed in order to prevent accidental release of the lock mechanism. Accordingly, the structure that is used to conceal the pushbutton makes the device difficult to operate.

Accordingly, there remains a need for a carabiner-type snap or safety hook that includes a locking mechanism that is easy to use.

There remains a need for a carabiner-type safety hook or snap hook that includes an intuitive release mechanism.

SUMMARY

It has been discovered that the problems left unanswered by known art can be solved by providing a carabiner having a gate with a locking mechanism that includes:
- a cylindrical locking element that must be rotated in order to release the gate;
- a guide pin that extends from the gate; and
- a guide that cooperates with the guide pin, the guide including a jogged portion that prevents free rotation of the cylindrical locking element.

Additionally, the cylindrical locking element of the disclosed carabiner can be opened single handedly by pulling the cylindrical locking element towards the palm of the user and turning the cylindrical locking element as it is pulled or moved along the gate.

It should also be understood that while the above and other advantages and results of the present invention will become apparent to those skilled in the art from the following detailed description and accompanying drawings, showing the contemplated novel construction, combinations and elements as herein described, and more particularly defined by the appended claims, it should be clearly understood that changes in the precise embodiments of the herein disclosed invention are meant to be included within the scope of the claims, except insofar as they may be precluded by the prior art.

DRAWINGS

The accompanying drawings illustrate preferred embodiments of the present invention according to the best mode presently devised for making and using the instant invention, and in which:

FIG. 1 is a side view of an example of the disclosed invention.

FIG. 2 is an end view of an example of the disclosed invention.

FIG. 3 illustrates the top and bottom of an example of the cylindrical locking element.

FIG. 4 is a side view of an example of the cylindrical locking element.

FIG. 5 is an end view of an example of the cylindrical locking element.

FIG. 6 illustrates examples of a pin and a spring that are used in the example illustrated in FIG. 1.

FIG. 7 is a side view of the pivoting gate used in the example illustrated in FIG. 1.

FIG. 8 is an end view of the pivoting gate used in the example illustrated in FIG. 1.

DETAILED DESCRIPTION OF PREFERRED EXEMPLAR EMBODIMENTS

Figure 9:
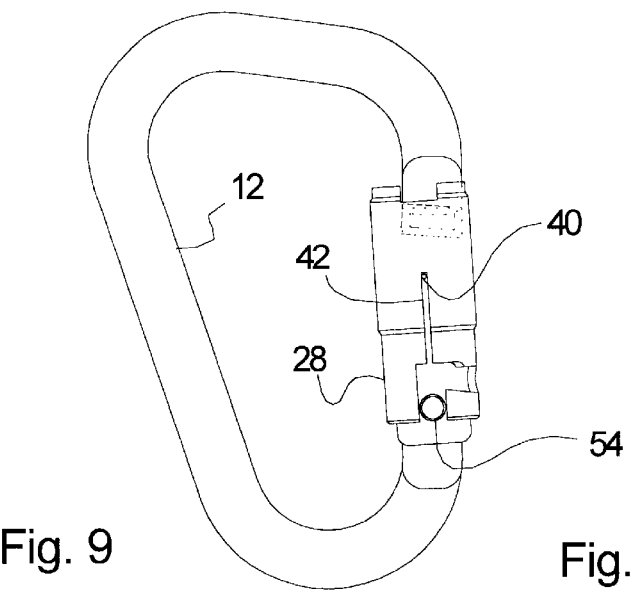
FIG. 9 illustrates the example illustrated in FIG. 1 while in the fully locked position.
Figure 10:
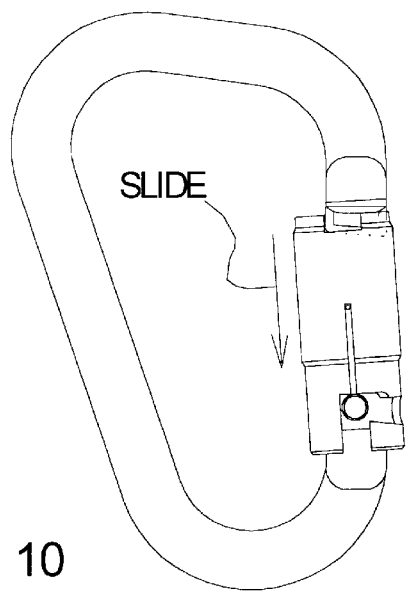
FIG. 10 illustrates the operation of the cylindrical locking element, as the locking element is pulled down, away from the latch leg of the C-shaped body.

While the invention will be described and disclosed here in connection with certain preferred embodiments, the description is not intended to limit the invention to the specific embodiments shown and described here, but rather the invention is intended to cover all alternative embodiments and modifications that fall within the spirit and scope of the invention as defined by the claims included herein as well as any equivalents of the disclosed and claimed invention.

Turning now to FIGS. 1 and 2 where an example of a carabiner 10 incorporating inventive aspects taught herein has been illustrated. The example is a carabiner type snap-hook that includes C-shaped body 12 that include a mouth 14 that has been defined by a gate support leg 16 and a latch leg 18. It will be understood from these figures that the latch leg 18 should include a protruding tab 20 that extends from the latch leg 18 towards the gate support leg 16.

Figure 14:
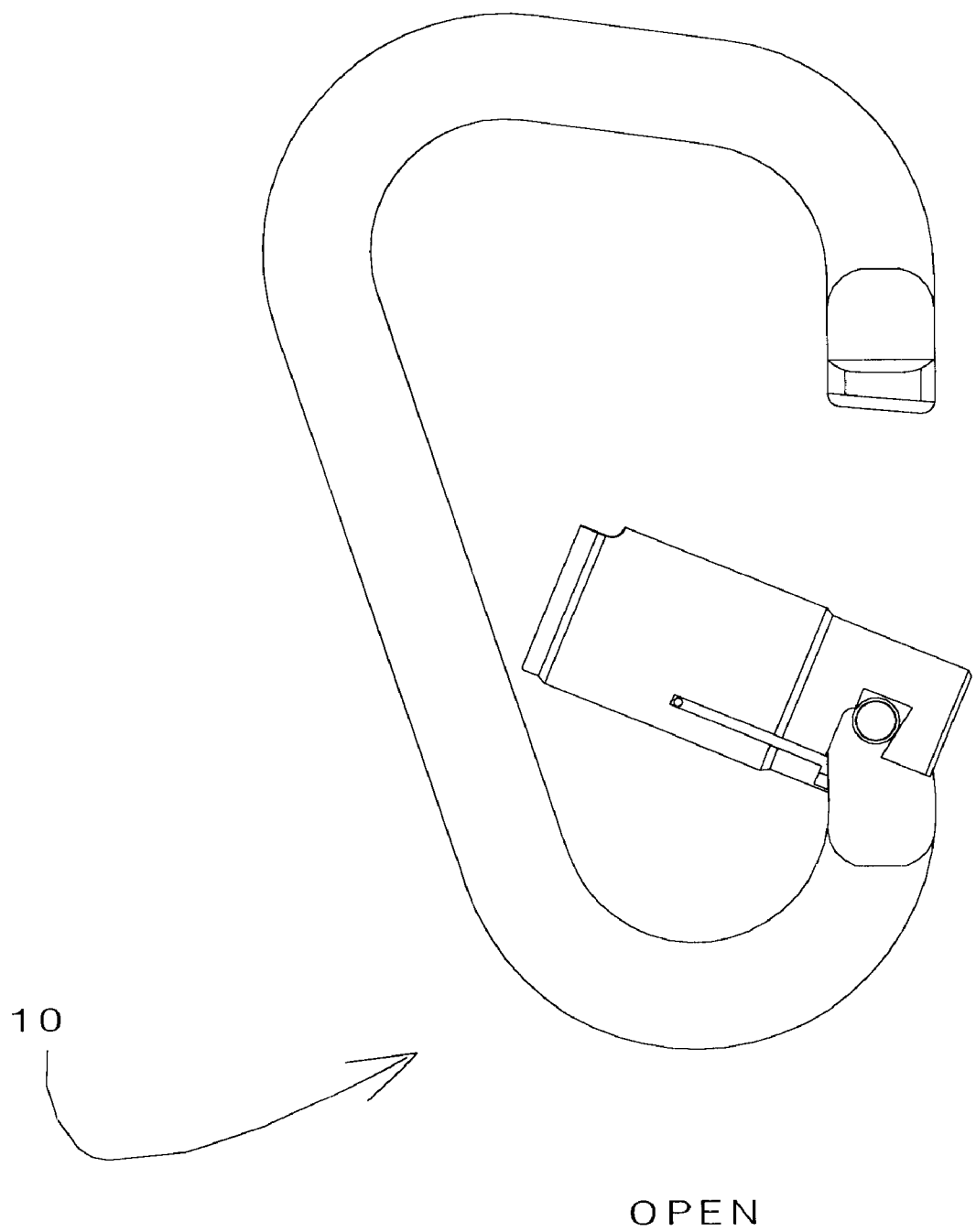
FIG. 14 illustrates the gate in the second position, with the mouth open.

Additionally, the carabiner 10 will include a pivoting gate 22, illustrated in greater detail in FIGS. 7 and 8, that serves to close or cover the mouth 14. As illustrated, the pivoting gate 22 should include a first end 26 that is pivotally supported from the support leg 16. A second end 24 of the pivoting gate 22 will rotate about the first end 26 and cooperate with the latch leg 18 to close the mouth 14. The closure or opening of the mouth 14 through the gate 22 is accomplished by moving the pivoting gate 22 to a first position, illustrated in FIGS. 1, 2, and 9, where the second end 24 of the pivoting gate 22 is positioned immediately opposite or next-to the latch leg 18, thereby closing the mouth 14. In order to open the mouth 14, and engage a rope or D-ring, for example, the pivoting gate 22 is moved to a second position, illustrated in FIG. 14 where the second end of the pivoting gate extends away from the latch leg, leaving the mouth 14 open.

Turning to FIGS. 1–5 it will be understood that a generally cylindrical locking element 28 will be mounted over the gate 22 and move over the gate 22 along a central axis 30. In order to lock the gate 22 in the first position, closing the mouth, the cylindrical locking element 28 is moved towards the second end 24 of the pivoting gate 22. By moving the cylindrical locking element 28 towards the first end 26 of the pivoting gate 22, the second end 24 of the pivoting gate 22 can be freed from the latch leg 18.

In the illustrated example, the cylindrical locking element 28 further cooperates with the protruding tab 20 on the latch leg 18 by requiring alignment of a recessed portion 32 with the protruding tab 20 before the pivoting gate 22 can be moved to the second position. Thus, in the illustrated example, the cylindrical locking element 28 is slid towards the first end 26 of the pivoting gate 22 and then, while near the first end 26, rotated over the pivoting gate 22 to align the recessed portion 32 with the protruding tab 20, so that the pivoting gate 22 can be moved to the second position.

Turning to FIGS. 1, 6, 7, and 8, it will be understood that it is contemplated that a spring 34 that urges the first end 36 of the cylindrical locking element 28 towards the second end 24 of the pivoting gate 22, and rotates the cylindrical locking element 28 about the pivoting gate 22 to a locking position where the cylindrical locking element 28 extends over a portion of the latch leg 18, and preferably only over the tab 20 and the pivoting gate 22 while the pivoting gate is in the first position. Additionally, the rotational bias provided by the spring 34 will keep the recessed portion 32 out of alignment with the tab 20, so as to prevent the release of the fist end 24 of the pivoting gate 22 from the latch leg 18.

The spring shown on FIG. 6 includes an inward leg 38, which extends radially towards the center of the spring 34, and an outward leg 40 that extends radially away from the center of the spring 34. The outward leg 40 fits into a slot 42 that extends along the cylindrical locking element 28 at an angle to the slot 42, and the inward leg 38 extends into an aperture 44 near the first end 26 of the pivoting gate 22, as illustrated in FIG. 7. The outward leg 40 urges the cylindrical locking element 28 towards the second end of the pivoting gate 22 and rotates the cylindrical locking element 28 to a resting position about the axis 30 where the recessed portion 32 does not align with the tab 20, and thus prevents the gate 22 from being released from the latch leg 18 and moving to the second position. In other words, the spring 34 returns the cylindrical locking element 28 to a locking position, illustrated in FIGS. 1 and 2, where the cylindrical locking element 28 extends over the latch leg 18 or tab 20.

Figure 11:
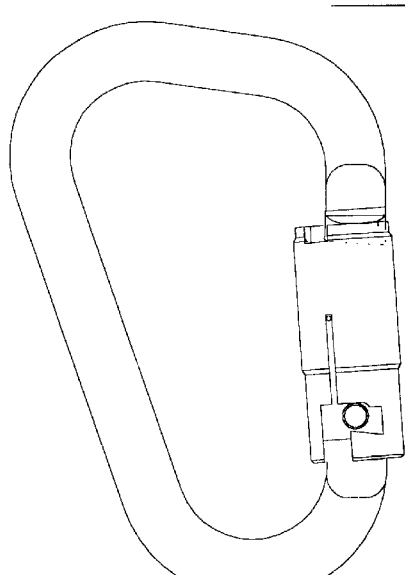
FIG. 11 illustrates rotation of the cylindrical locking element and the obstruction of the rotational movement by the jogged portion in the gate release slotted guide before the pin enters the gate release portion.

Turning now to FIGS. 1, 4, and 11, it will be understood that it is contemplated that the locking mechanism will use a vertical slotted guide 46, which may be incorporated into the cylindrical locking element 28 or the pivoting gate 22. In the illustrated example, the vertical slotted guide extends through the cylindrical locking element 28 and along the axis 30 of the cylindrical locking element. Additionally, it is contemplated that a gate release slotted guide 48 will be used in conjunction with the vertical slotted guide 46. In the illustrated example, the gate release slotted guide 46 extends from the vertical slotted guide 46 and around the cylindrical locking element 28. In the illustrated example, the gate release slotted guide 48 has been incorporated into the cylindrical locking element 28 with an angle 43 extending between the vertical slotted guide and the gate release slotted guide. Furthermore, in this example, the gate release slot 48 includes a jogged portion 50 and a gate release portion 52. The jogged portion 50 has been illustrated as being between the gate release portion 52 and the vertical slotted guide 46.

Figure 12:
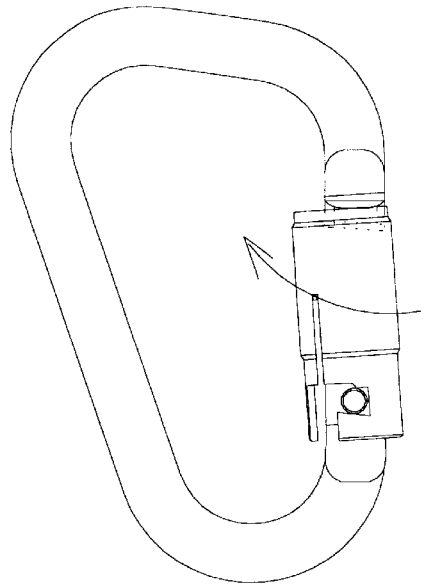
FIG. 12 illustrates the movement of the cylindrical locking element to clear the jogged portion, allowing the pin to enter the gate release portion.
Figure 13:
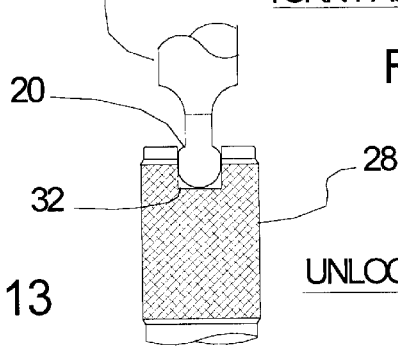
FIG. 13 illustrates the alignment of the recessed portion of the cylindrical locking element and the tab that extends from the latch leg to allow movement of the gate to the second position.

In operation, a guide pin 54, which has been illustrated in FIGS. 1, 6, and 9–12, is attached or fixed to the pivoting gate and extends through the vertical slotted guide 46. The guide pin 54 is adapted for sliding movement through the vertical slotted guide 46 and through the gate release slot 48. Thus, to release the pivoting gate 22 in order to move the pivoting gate 22 from the first position to the second position, the cylindrical locking element 28 must be moved such that the guide pin 54 is slid through the vertical slotted guide 46 and through the gate release slot 48 until the guide pin reaches gate release portion 52 of the gate release slot 48. However, as illustrated in FIGS. 11 and 12, the guide pin 54 must pass by the jogged portion 50 before reaching the gate release portion 52.

It is important to note that the passage of the guide pin 54 from the slotted guide 46 to the gate release portion 52 with the obstruction provided by the jogged portion 50 reduces the possibility of accidental or undesired opening of the pivoting gate 22 by requiring a combined rotation and axial movement of the cylindrical locking element before the recessed portion 32 is aligned with the tab 20 or similar component on the latch leg 18. For example, with known carabiners that include a sleeve for locking the gate, a rope, strap or similar section of material can wind around the cylindrical locking element and rotate this element as the rope or strap is pulled by the weight of the falling person. The rotation of the locking element can position the cylindrical locking element in a manner that allows the gate to open with the continued fall of the individual, leading to a tragic result. The inclusion of a diverting path, as created by the jogged portion 50, can stop the motion of the cylindrical locking element 28 in the event of the inadvertent rotation of the cylindrical locking element 28 by an entangled rope or strap.

It is also important to note that the disclosed invention will allow the user to operate the locking mechanism and open the gate by pulling the cylindrical locking element 28 away from the latch leg 18, and thus making the use of the carabiner intuitive and accommodating the natural pull and twist capabilities of the guide pin is attached connected to said pivoting gate.

Thus it can be appreciated that the above-described embodiments are illustrative of just a few of the numerous variations of arrangements of the disclosed elements used to carry out the disclosed invention. Moreover, while the invention has been particularly shown, described and illustrated in detail with reference to preferred embodiments and modifications thereof, it should be understood that the foregoing and other modifications are exemplary only, and that equivalent changes in form and detail may be made without departing from the true spirit and scope of the invention as claimed, except as precluded by the prior art.

What is claimed is:

1. A carabiner comprising:
   a C-shaped body having a mouth defined by a gate support leg and a latch leg, the latch leg having a protruding tab that extends from the latch leg towards the gate support leg, and a pivoting gate, the pivoting gate having a first end that is pivotally supported from the support leg, and a second end, the second end cooperating with the latch leg and moving from a first position where the second end of the support leg is immediately opposite to the latch leg and closing the mouth, and a second position where the second end of the pivoting gate extends away from the latch leg, leaving the mouth open;
   a generally cylindrical locking element, the cylindrical locking element having a first end having a recessed portion, the cylindrical locking element being mounted over the pivoting gate and having a central axis, the cylindrical locking element being connected to the pivoting gate by a spring that urges the first end of the cylindrical locking element towards the second end of the pivoting gate and rotates the cylindrical locking element about the pivoting gate to a locking position where the cylindrical locking element extends over the latch leg and the pivoting gate while the pivoting gate is in the first position, the cylindrical locking element further being rotatable about the pivoting gate to a release position where recessed portion aligns with the tab portion of the latch leg;
   a vertical slotted guide, the vertical slotted guide extending along the axis of the locking element and a gate release slotted guide, the gate release slotted guide extending from the vertical slotted guide and around the locking element, the gate release slotted guide having a jogged portion and a gate release portion, the jogged portion being between the gate release portion and the vertical slotted guide;
   a guide pin, the guide pin being adapted for extending through said vertical slotted guide and being adapted for sliding movement through said gate release slotted guide when said guide pin is in said locking position, said cylindrical locking element being movable from the locking position to the release position by first sliding the cylindrical locking element along the vertical slotted guide and then rotating the cylindrical locking element against the spring so that guide pin moves along the gate release slotted guide, past the jogged portion and into said gate release portion where said cylindrical locking element is in the release position.

2. A carabiner according to claim 1 wherein said vertical slotted guide and said gate release slotted guide are part of said cylindrical locking element.

3. A carabiner according to claim 2 wherein said guide pin is attached to said pivoting gate.

4. A carabiner according to claim 3 wherein said guide pin is located near the first end of said pivoting gate.

5. A carabiner comprising:
   a C-shaped body having a mouth defined by a gate support leg and a latch leg, the latch leg having a protruding tab that extends from the latch leg towards the gate support leg, and a pivoting gate, the pivoting gate having a first end that is pivotally supported from the support leg, and a second end, the second end cooperating with the latch leg and moving from a first position where the second end of the support leg is immediately opposite to the latch leg and closing the mouth, and a second position where the second end of the pivoting gate extends away from the latch leg, leaving the mouth open;
   a generally cylindrical locking element, the cylindrical locking element having a first end having a recessed portion, the cylindrical locking element being mounted over the pivoting gate and having a central axis, the cylindrical locking element being connected to the pivoting gate by a spring that urges the first end of the cylindrical locking element towards the second end of the pivoting gate and rotates the cylindrical locking element about the pivoting gate to a locking position where the cylindrical locking element extends over the latch leg and the pivoting gate while the pivoting gate is in the first position, the cylindrical locking element further being rotatable about the pivoting gate to a release position where recessed portion aligns with the tab portion of the latch leg;
   a vertical slotted guide, the vertical slotted guide extending through the cylindrical locking element and along the axis of the cylindrical locking element and a gate release slotted guide, the gate release slotted guide extending from the vertical slotted guide and around the locking element, the gate release slotted guide having a jogged portion and a gate release portion, the jogged portion being between the gate release portion and the vertical slotted guide;
   a guide pin, the guide pin being adapted for extending through said vertical slotted guide and being adapted for sliding movement through said gate release slotted guide when said cylindrical locking element is in said locking position, said cylindrical locking element being movable from the locking position to the release position by first sliding the guide pin along the vertical slotted guide and then rotating the cylindrical locking element against the spring so that guide pin moves along the gate release slotted guide, past the jogged portion and into said gate release portion where said cylindrical locking element is in the release position.

6. A carabiner according to claim 5 wherein said spring is a compression spring that is attached to the cylindrical locking element and to the pivoting gate, the spring being connected to the pivoting gate at a location near the first end of the pivoting gate.

7. A carabiner according to claim 6 wherein said spring is also connected to the cylindrical locking element at a location near the first end of the cylindrical locking element.

8. A carabiner according to claim 5 wherein said gate release slotted guide is at an angle to the vertical slotted guide.

9. A carabiner according to claim 5 wherein said guide pin is attached to said pivoting gate.

10. A method for preventing an unplanned opening of a carabiner, the carabiner comprising:
    a C-shaped body having a mouth defined by a gate support leg and a latch leg, the latch leg having a protruding tab that extend from the latch leg towards the gate support leg, and a pivoting gate, the pivoting gate having a first end that is pivotally supported from the support leg, and a second end, the second end cooperating with the latch leg and moving from a first position where the second end of the support leg is immediately opposite to the latch leg and closing the mouth, and a second position where the second end of the pivoting gate extends away from the latch leg, leaving the mouth open, the method comprising:

providing a generally cylindrical locking element, the cylindrical locking element having a first end having a recessed portion and a central axis, the cylindrical locking element being mounted over the pivoting gate, the cylindrical locking element being connected to the pivoting gate by a spring that urges the first end of the cylindrical locking element towards the second end of the pivoting gate and rotates the cylindrical locking element about the pivoting gate to a locking position where the cylindrical locking element extends over the latch leg and the pivoting gate while the pivoting gate is in the first position, the cylindrical locking element further being rotatable about the pivoting gate to a release position where recessed portion aligns with the tab portion of the latch leg;

providing a vertical slotted guide, the vertical slotted guide extending along the axis of the cylindrical locking element and a gate release slotted guide, the gate release slotted guide extending from the vertical slotted guide and around the locking element, the gate release slotted guide having a jogged portion and a gate release portion, the jogged portion being between the gate release portion and the vertical slotted guide;

providing a guide pin, the guide pin being adapted for extending through said vertical slotted guide and being adapted for sliding movement through said gate release slotted guide mounting said cylindrical locking element over said guide pin, so that said cylindrical locking element is movable from the locking position to the release position by first sliding the cylindrical locking element along the vertical slotted guide and then rotating the cylindrical locking element against the spring so that guide pin moves along the gate release slotted guide, past the jogged portion and into said gate release portion where said cylindrical locking element is in the release position.

11. A method according to claim 10 wherein providing that said slotted guide and said gate release slot are part of said cylindrical locking element.

12. A method according to claim 11 wherein having said guide pin attached to said pivoting gate.

13. A method according to claim 2 wherein providing said guide pin located near the first end of said pivoting gate.

\* \* \* \* \*